United States Patent
Hill

(10) Patent No.: US 11,469,605 B2
(45) Date of Patent: Oct. 11, 2022

(54) SYSTEMS AND METHODS FOR SELECTABLE BATTERY CONFIGURATION IN A PORTABLE DEVICE

(71) Applicant: Emerson Electric Co., St. Louis, MO (US)

(72) Inventor: Jason Hill, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 434 days.

(21) Appl. No.: 16/510,597

(22) Filed: Jul. 12, 2019

(65) Prior Publication Data

US 2021/0013726 A1  Jan. 14, 2021

(51) Int. Cl.
| | |
|---|---|
| *H02J 7/00* | (2006.01) |
| *B25F 5/02* | (2006.01) |
| *B27B 17/08* | (2006.01) |

(52) U.S. Cl.
CPC .............. *H02J 7/0063* (2013.01); *B25F 5/02* (2013.01); *B27B 17/08* (2013.01); *H02J 2007/0067* (2013.01)

(58) Field of Classification Search
CPC ...................................................... H02J 7/0091
USPC ....................................................... 320/117
See application file for complete search history.

(56) References Cited

U.S. PATENT DOCUMENTS

| | | | | |
|---|---|---|---|---|
| 8,981,721 B2* | 3/2015 | Yamauchi | ............... | B60L 50/16 |
| | | | | 320/116 |
| 9,444,267 B2* | 9/2016 | Suzuki | ................... | H02J 7/0019 |
| 9,698,720 B2* | 7/2017 | Hawliczek | .............. | H02P 27/06 |
| 2009/0091332 A1* | 4/2009 | Emori | ..................... | B60L 50/64 |
| | | | | 324/537 |
| 2012/0078181 A1* | 3/2012 | Smith | ............... | A61M 5/16804 |
| | | | | 604/152 |
| 2014/0152261 A1* | 6/2014 | Yamauchi | ............ | G01R 31/396 |
| | | | | 320/118 |

* cited by examiner

*Primary Examiner* — Yalkew Fantu
(74) *Attorney, Agent, or Firm* — Armstrong Teasdale LLP

(57) ABSTRACT

An apparatus and method for managing power supplied to a portable electrical device includes an electrical connector configured to engage a complementary electrical connector of the respective battery. The portable battery-powered device also includes a selector switch configured to couple the electrical connectors of the plurality of power receptacles in at least one of a series configuration, a parallel configuration, and a combination of series and parallel configuration. The portable battery-powered device further includes an electrical load device including one or more electrical leads coupled to the selector switch. The selector switch is selectable during operation of the portable battery-powered device to provide power to the electrical device from a plurality of battery packs coupled in the at least one of a series configuration, a parallel configuration, and a combination of series and parallel configuration.

11 Claims, 4 Drawing Sheets

SYSTEMS AND METHODS FOR SELECTABLE BATTERY CONFIGURATION IN A PORTABLE DEVICE

FIELD

This disclosure relates generally to power source devices for man-portable devices and, more particularly, to management of power source devices for man-portable battery-powered electrical devices.

BACKGROUND

Portable electrical devices, such as, hand-held and portable tools are often powered by more than one power source devices, such as, a battery pack including a plurality of cells or a plurality of battery packs electrically coupled together. Typically, the battery packs are coupled together in one of three configurations, (1) in electrical series, (2) in parallel, or (3) in series/parallel, in which some of the battery packs are coupled in series and the series-coupled battery packs are then coupled in parallel. The battery packs can also be coupled together with some of the battery packs coupled in parallel and the parallelly-coupled battery packs then coupled in series. The manufacturer typically couples the battery packs in the series/parallel configuration as a compromise to serve a generic need. The series connected battery packs provide a relatively higher voltage than the parallelly connected battery packs, the parallelly connected battery packs provides a longer life at a relatively lower voltage. The series/parallel connected battery packs have improved life over the series connected battery packs and improved voltage over the parallelly connected battery packs.

During use of battery-powered devices various demands are placed on the electric motor, which are not always optimally met by the battery configuration of the battery-powered device. In some situations, a higher motor torque may be necessary for good performance of the battery-powered device. In other situations, a higher motor speed may be desired. Changing the battery-powered device's battery configuration when changing between such situations is interruptive to the use of the battery-powered device and may not be possible with many existing battery packs.

Additionally, as batteries and battery packs discharge, the battery voltage the batteries and battery packs typically declines. During use, selectively switching from for example, a parallel battery configuration where the total battery voltage is equal to the voltage of the highest voltage battery pack, to the series battery configuration where the total battery voltage is equal to the sum of all the battery packs, may permit a more constant total output voltage to the battery-powered device.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a method of managing power supplied to a portable electrical device or tool includes powering the portable electrical device from a plurality of battery packs. The battery packs are electrically coupled together in a selected first configuration including at least one of a series configuration, a parallel configuration, and a series/parallel configuration. During operation of the portable electrical device, the method includes switching the configuration of the battery packs from the first configuration to a selected second configuration different from the selected first configuration, and powering the portable electrical device using the selected second configuration of the plurality of battery packs.

In another aspect, a portable battery-powered device includes a plurality of power receptacles. Each of the plurality of power receptacles includes a mechanical latching device configured to receive a complementary latching device of a respective battery and an electrical connector configured to engage a complementary electrical connector of the respective battery. The portable battery-powered device also includes an selector switch configured to couple the electrical connectors of the plurality of power receptacles in at least one of a series configuration, a parallel configuration, and a combination of series and parallel configuration. The portable battery-powered device further includes an electrical load device including one or more electrical leads coupled to the selector switch. The selector switch is selectable during operation of the portable battery-powered device to provide power to the electrical device from a plurality of battery packs coupled in the at least one of a series configuration, a parallel configuration, and a combination of series and parallel configuration.

In yet another aspect, a power supply system of a portable battery-powered device includes a power source device interface that includes a plurality of power receptacles. Each of the plurality of power receptacles includes a mechanical latching device configured to receive a complementary latching device of a respective battery and an electrical connector configured to engage a complementary electrical connector of the respective battery. The power supply system also includes a selector switch configured to couple the electrical connectors of the plurality of power receptacles in at least one of a series configuration, a parallel configuration, and a combination of series and parallel configuration. The power supply system further includes an electrical load device comprising one or more electrical leads coupled to the selector switch. The selector switch is selectable during operation of the portable battery-powered device to provide power to the electrical device from a plurality of battery packs coupled in the at least one of a series configuration, a parallel configuration, and combination of series and parallel configuration.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 1 is a perspective view of an example man-portable battery-powered electrical device position.

FIG. 1 is a perspective view of an example man-portable battery-powered electrical device position.

Corresponding reference characters indicate corresponding parts throughout the several views of the drawings.

DETAILED DESCRIPTION

Embodiments of the methods and systems described relate to the use of multiple battery packs or cells on cordless power devices or tools and outdoor power products. Battery-powered devices or tools can include handheld tools such as, but not limited to drills, saws, buffers, sanders, weed-whackers, edgers, and the like. Battery-powered devices or tools can include also include man-portable tools and equipment such as backpack-style vacuums and leaf blowers. Battery-powered devices or tools can include further include wheeled equipment, such as, shop-vacs, fans, blowers, and the like. Most battery-powered devices or tools have electrical power requirements that extend over a range from a nominal measurement, such as, voltage. Additionally, battery-powered tools can operate under varying load conditions. Such battery packs and/or cells can be used in a parallel, series, or series/parallel configuration. Such configurations may offer different and sometimes mutually exclusive electrical characteristics. Generally, battery packs or cells configured in parallel may offer increased runtime while those configured more serially offer higher voltages and potentially higher product power levels. Various embodiments are described below that leverage the opportunity to optionally alternate the configurations to tailor product characteristics to the users' specific needs. For example, a drill operating in a parallel battery configuration that suddenly demands greater torque or speed output, may automatically switch to a series battery configuration. Similarly, a drill operating in a series configuration that is not experiencing a significant torque demand, may automatically switch to the parallel battery configuration to extend battery life.

Figure 1:
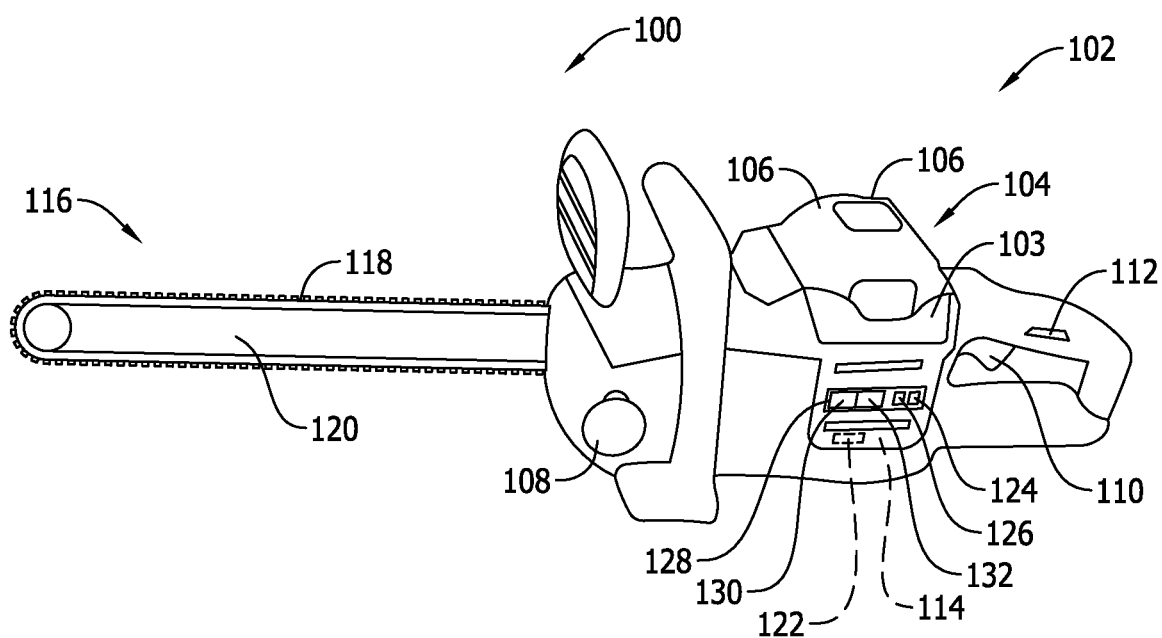
FIG. 1 is a perspective view of an example man-portable battery-powered electrical device.

FIG. 1 is a perspective view of an example man-portable battery-powered electrical device 100. In the example embodiment, man-portable battery-powered electrical device is a battery powered chainsaw. In other embodiments, man-portable battery-powered electrical device 100 may be, for example, a leaf blower, vacuum cleaner, pressure washer, and the like. Electrical device 100 includes a powerhead 102 including a power source device interface 103. Power source device interface 103 is configured to receive a plurality of power source devices 104, such as, but not limited to a plurality of battery packs 106 or cells. Electrical device 100 also includes a motor 108 and an on/off trigger switch 110 configured to selectively couple power source device 104 to motor 108. Powerhead 102 also includes a configuration selector switch 112 that is configured to manually or automatically alter a configuration of the plurality of battery packs 106 or cells. In some embodiments, selector switch 112 is a manual switch that only affects the configuration of plurality of battery packs 106 or cells when switched to another position manually by a user. In other embodiments, selector switch 112 permits a device controller 114 within powerhead 102 to select the configuration of the plurality of battery packs 106 or cells automatically. Powerhead 102 is mechanically coupled to a load 116, in the example embodiment, a chainsaw chain 118 driven about a bar 120 by motor 108. A device sensor 122 is configured to generate an output related to a parameter of electrical device 100. Device controller 114 is configured to receive the output and command the selector switch 112 to a predetermined position based on the output. Device sensor 122 may include any of a current sensor, a speed sensor, a pressure sensor, a negative pressure sensor, a torque sensor, a voltage sensor, a temperature sensor, and the like. For example, in one embodiment, electrical device 100 runs in series mode only until a maximum temperature threshold is met, then electrical device 100 shifts to another mode to reduce temperature. In various embodiments, device controller 114 includes at least one processor 124 communicatively coupled to one or more memory devices 126, device sensor 122, and a user interface 128 that includes a display portion 130 and an input portion 132.

Figure 2:
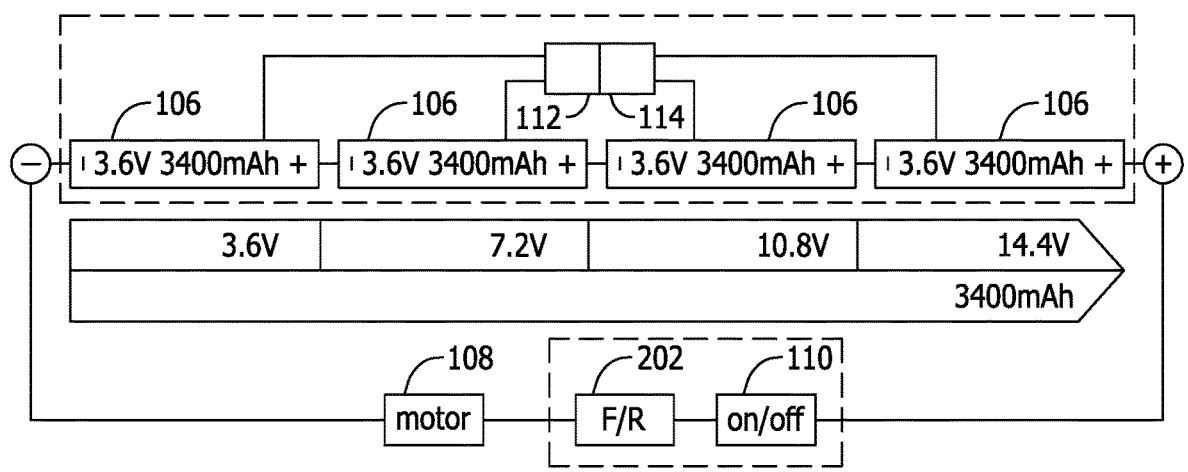
FIG. 2 is a schematic block diagram of the electrical device in accordance with an example embodiment of the present disclosure.
Figure 3:
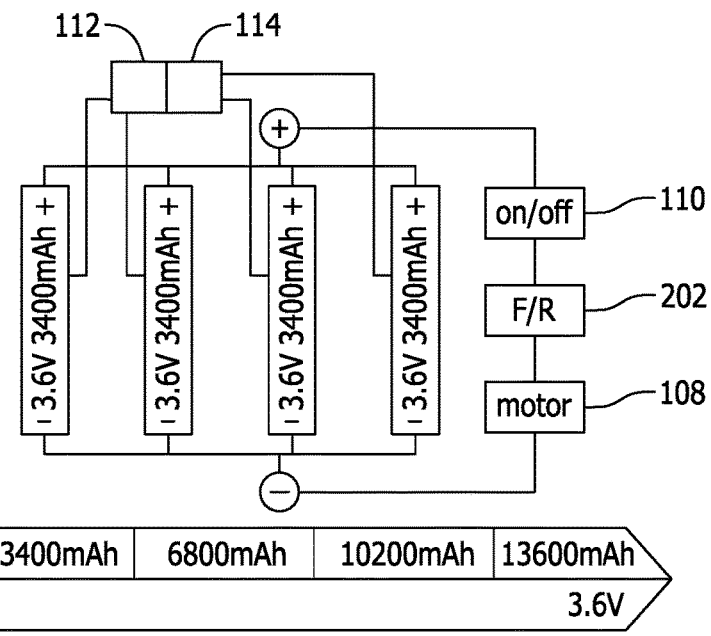
FIG. 3 is a schematic block diagram of the electrical device in accordance with another example embodiment of the present disclosure.
Figure 4:
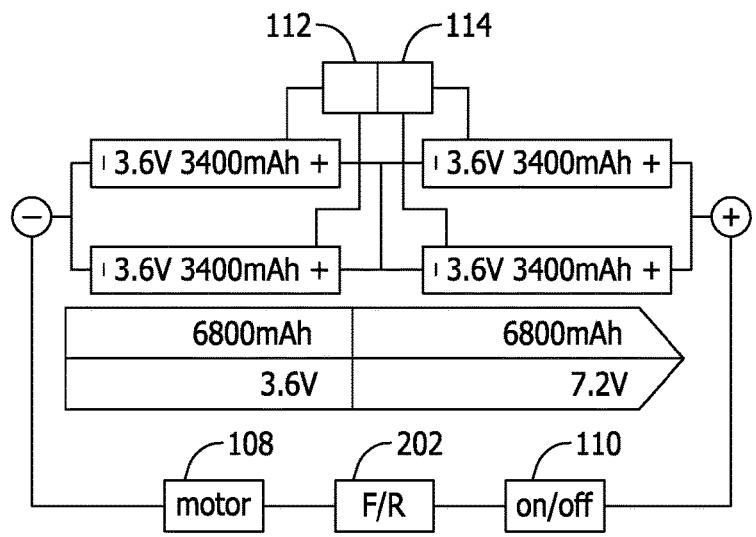
FIG. 4 is a schematic block diagram of the electrical device in accordance with yet another example embodiment of the present disclosure.

FIG. 2 is a schematic block diagram of electrical device 100 in accordance with an example embodiment of the present disclosure. In the example embodiment, four battery packs 106 or cells are connected in electrical series. Each battery pack 106 or cell is rated for 3.6 Volts and has a capacity of 3400 milli-Ampere-hours (mAh). The total voltage available then, is 14.4 Volts. FIG. 3 is a schematic block diagram of electrical device 100 in accordance with another example embodiment of the present disclosure. In this example embodiment, four battery packs 106 or cells are connected in electrical parallel. Each battery pack 106 or cell is rated for 3.6 Volts and has a capacity of 3400 mAh. The total capacity available is 13600 mAh. FIG. 4 is a schematic block diagram of electrical device 100 in accordance with yet another example embodiment of the present disclosure. In this example embodiment, four battery packs 106 or cells are connected in electrical series/parallel. Each battery pack 106 or cell is rated for 3.6 Volts and has a capacity of 3400 mAh. The total voltage available in this configuration is 7.2 Volts and the total capacity available is 6800 mAh.

Figure 5:
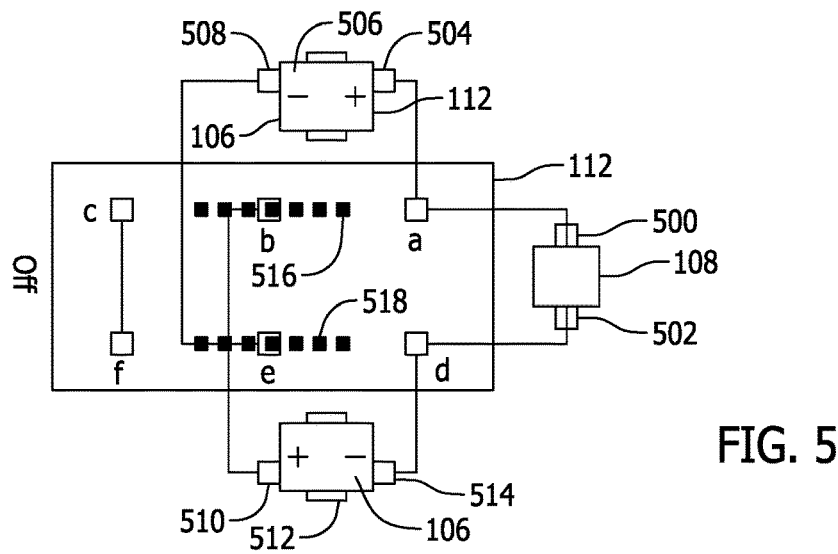
FIG. 5 is a schematic diagram of the selector switch in accordance with an example embodiment of the present disclosure.

FIG. 5 is a schematic diagram of selector switch 112 in accordance with an example embodiment of the present disclosure. In the example embodiment, selector switch 112 is a double-pole, double throw (DPDT) type switch. Although shown with reference to a DPDT switch, any number of other switch-type devices can be used to configure battery packs 106 in the series, parallel, or series/parallel configurations. Additionally, semiconductor devices may be used to electrically connect battery packs 106. In FIG. 5 selector switch 112 is illustrated in an "off" position where all six contacts, labeled, "a", "b", "c", "d", "e", and "f", are not connected internally to selector switch 112. The external electrical wiring is connected to selector switch 112 as follows: a first terminal 500 of motor 108 is connected to contact "a" and a second terminal 502 of motor 108 is connected to contact "d." A positive terminal 504 of a first battery pack 506 is also connected to contact "a" and a negative terminal 508 of first battery pack 506 is connected to terminal "e." A positive terminal 510 of a second battery pack 51.2 is connected to contact "b" and a negative terminal 514 of second battery pack 512 is also connected to terminal "d." Contacts "c" and "f" are shorted together. During operation, in the "off" position, the poles 516 and 518 of selector switch 112 are in an intermediate position and do not short any contacts.

Figure 6:
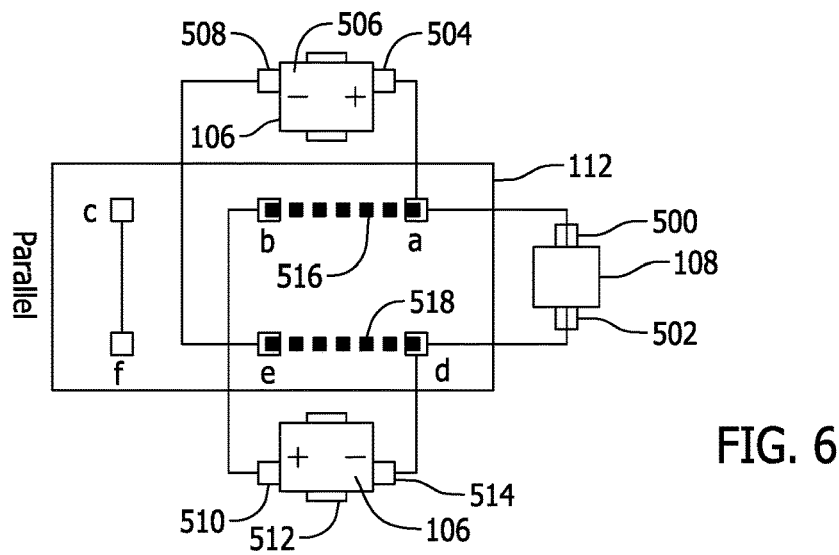
FIG. 6 is a schematic diagram of the selector switch in a parallel

FIG. 6 is a schematic diagram of selector switch 112 in a parallel position. In this position, pole 516 shorts contacts "a" and "b" and pole 518 shorts contacts "d" and "e," establishing a path for current flow to first terminal 500 of motor 108 from the positive terminal 504 of first battery pack 506 through contact "a" and from the positive terminal 510 of second battery pack 512 through contact "b," pole 516, and contact "a." A return path is established between second terminal 502 of motor 108 to the negative terminal 508 of first battery pack 506 through contact "d," pole 518, and contact "e" and to the negative terminal 514 of second battery pack 51.2 through contact "d." Accordingly, because the positive terminals 504 and 510 of first battery pack 506 and second battery pack 512 are connected to first terminal 500 of motor 108, and the negative terminals 508 and 514 of first battery pack 506 and second battery pack 512 are connected to second terminal 502 of motor 108, battery packs 106 are connected in the parallel configuration.

Figure 7:
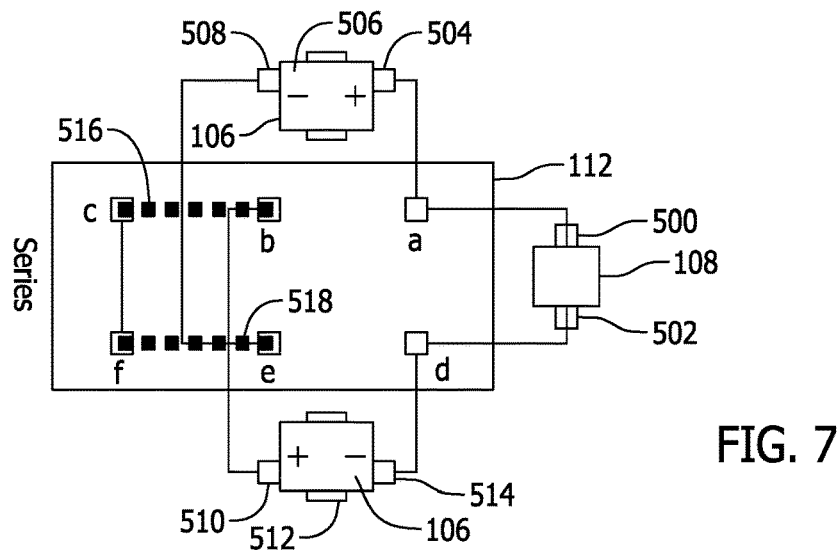
FIG. 7 is a schematic diagram of selector switch in a series

FIG. 7 is a schematic diagram of selector switch 112 in a series position. In this position, pole 516 shorts contacts "b" and "c" and pole 518 shorts contacts "e" and "f," establishing a series path for current flow through first battery pack 506 and second battery pack 512.

Figure 8:
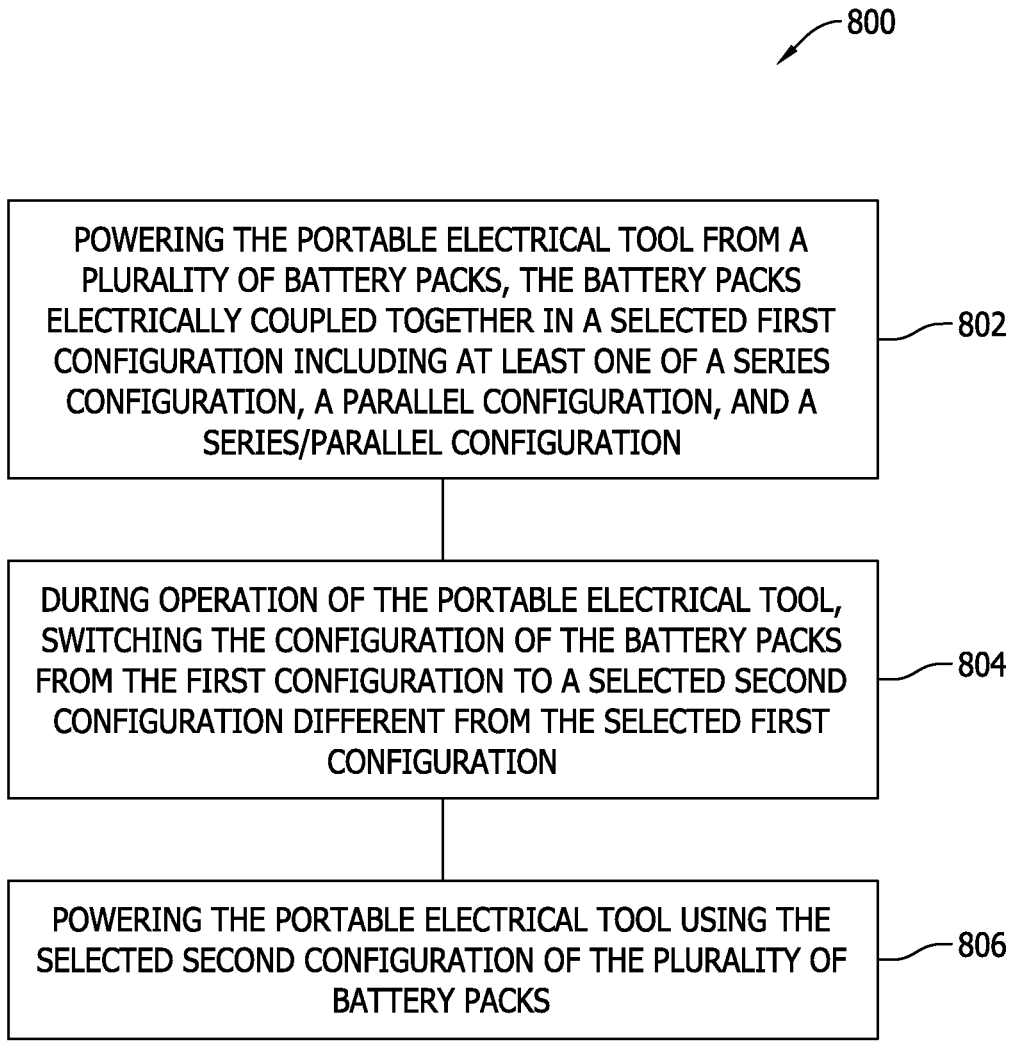
FIG. 8 is a flowchart of a method of managing power supplied to a portable electrical device.

FIG. 8 is a flowchart of a method 800 of managing power supplied to a portable electrical device. In the example embodiment, method 800 includes powering 802 the portable electrical device from a plurality of battery packs. The battery packs are electrically coupled together in a selected first configuration including at least one of a series configuration, a parallel configuration, and a series/parallel configuration. Method 800 also includes switching 804 the configuration of the battery packs from the first configuration to a selected second configuration different from the selected first configuration during operation of the portable electrical device. Method 800 further includes powering 806 the portable electrical device using the selected second configuration of the plurality of battery packs.

Optionally, switching 804 the configuration of the battery packs includes manually switching the configuration of the battery packs via an input received from a user and manually switching 804 the configuration of the battery packs to a series configuration via an input received from a user to increase a rotational speed of the portable electrical device. Also optionally, switching 804 the configuration of the battery packs includes manually switching the configuration of the battery packs to a parallel configuration via an input received from a user to increase an amount of torque generated by the portable electrical device. In a further option, method 800 includes automatically switching the configuration of the battery packs based on a parameter of the portable electrical device. In various embodiments, the configuration of the battery packs is based on an input from at least one of a physical sensor and a virtual sensor. As used herein, "virtual sensor" may refer to a mathematical algorithm or model that produces output measures comparable to a physical sensor based on inputs from other systems, such as physical sensors. Electrical device 100 may include a plurality of virtual sensors to predict or derive a sensing parameter where a corresponding physical sensor does not exist. In certain embodiments, electrical device may include a plurality of virtual sensor models. For example, electrical device 100 may include a virtual temperature or pressure sensor to predict the sensing parameter remaining battery capacity.

Optionally, the portable electrical device includes an electric motor and wherein automatically switching 804 the configuration of the battery packs includes automatically switching the configuration of the battery packs based on at least one of a rotational speed of the electric motor and a torque generated by the electric motor.

During operation, battery-powered electrical device 100 may encounter various workpiece characteristics that may impact the operation of battery-powered electrical device 100. For example, when battery-powered electrical device 100 is embodied in a circular saw tool, different materials may be encountered during the same job. The different materials may be optimally cut using different saw blade speeds, or moving from cutting one material to another, additional torque may become necessary. Switching from one configuration to another during operation permits a user to receive optimal performance from his circular saw tool without having to stop the job to switch battery packs or to realign the battery packs. In another embodiment, when battery-powered electrical device 100 is embodied in a man-portable vacuum cleaner device, the vacuum cleaner device may become clogged while operating in the parallel battery configuration. Automatically switching to the series battery configuration may increase the motor speed, increasing the suction of the vacuum cleaner device and potentially clearing the blockage.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of managing power supplied to a portable electrical device, the method comprising:

powering the portable electrical device from a plurality of power source devices, the plurality of power source devices electrically coupled together in a selected first configuration, the first configuration being one of a series configuration, a parallel configuration, and a series/parallel configuration;

during operation of the portable electrical device, operating a mechanical selector switch connected to the plurality of power source devices and having at least a first position and a second position to switch a configuration of the plurality of power source devices from the first configuration when the mechanical selector switch is in the first position to a selected second configuration different from the first configuration when the mechanical selector switch is in the second position, the second configuration being one of a series configuration, a parallel configuration, and a series/parallel configuration; and powering the portable electrical device using the selected second configuration of the plurality of power source devices.

2. The method of claim 1, wherein the first configuration is a parallel configuration, and the second configuration is a series configuration to increase a rotational speed of the portable electrical device.

3. The method of claim 1, wherein the first configuration is a series configuration, the second configuration is a parallel configuration to increase an amount of torque generated by the portable electrical device.

4. The method of claim 1, wherein operating a mechanical selector switch comprises operating a mechanical double pole double throw switch.

5. A portable battery-powered device comprising:

a plurality of power receptacles, each of the plurality of power receptacles comprising:

a mechanical latching device configured to receive a complementary latching device of a respective battery; and an electrical connector configured to engage a complementary electrical connector of the respective battery;

a mechanical selector switch connected to the electrical connectors of the plurality of power receptacles and having at least a first position and a second position, the first position configures the electrical connectors of the plurality of power receptacles in a first configuration selected from a series configuration, a parallel configuration, and a combination of series and parallel configuration, the second position configures the electrical connectors of the plurality of power receptacles in a second configuration selected from a series configuration, a parallel configuration, and a combination of series and parallel configuration, wherein the second configuration is different than the first configuration; and an electrical load device comprising one or more electrical leads coupled to the mechanical selector switch, wherein a position of the mechanical selector switch is selectable between the first position and the second position during operation of the portable battery-powered device to provide power to the electrical load device from a plurality of batteries coupled to the plurality of power receptacles with the batteries configured in accordance with the selected position of the mechanical selector switch.

6. The portable battery-powered device of claim 5, wherein the mechanical selector switch comprises a mechanical double pole double throw switch.

7. The portable battery-powered device of claim 5, wherein each battery of the plurality of batteries comprises a rechargeable battery pack comprising a plurality of rechargeable cells.

8. The portable battery-powered device of claim 5, wherein each battery of the plurality of batteries comprises a rechargeable cell.

9. The portable battery-powered device of claim 5, wherein the mechanical latching device comprises at least one of a friction fit and an interference fit between a power receptacle and the respective battery received therein.

10. A power supply system of a portable battery-powered device, the power supply system comprising:

a power source device interface comprising a plurality of power receptacles, each of the plurality of power receptacles including a mechanical latching device configured to receive a complementary latching device of a respective battery and an electrical connector configured to engage a complementary electrical connector of the respective battery;

a mechanical selector switch connected to the electrical connectors of the plurality of power receptacles and having at least a first position and a second position, the first position configures the electrical connectors of the plurality of power receptacles in a first configuration selected from a series configuration, a parallel configuration, and a combination of series and parallel configuration, the second position configures the electrical connectors of the plurality of power receptacles in a second configuration selected from a series configuration, a parallel configuration, and a combination of series and parallel configuration, wherein the second configuration is different than the first configuration; and an electrical load device comprising one or more electrical leads coupled to the mechanical selector switch, wherein a position of the mechanical selector switch is selectable between the first position and the second position during operation of the portable battery-powered device to provide power to the electrical load device from a plurality of batteries coupled to the plurality of power receptacles with the batteries configured in accordance with the selected position of the mechanical selector switch.

11. The power supply system of claim 10, wherein the mechanical selector switch comprises a mechanical double pole double throw switch.

* * * * *